United States Patent
Klein et al.

(10) Patent No.: US 6,401,397 B2
(45) Date of Patent: *Jun. 11, 2002

(54) SEALING PROFILE HAVING A TWO LAYER COVERING ELEMENT

(75) Inventors: Jürgen Klein, Hannover; Rudolf Szed, Cologne; Werner Sievers, Laatzen, all of (DE)

(73) Assignee: Henniges Elastomer- und Kunststofftechnik GmbH & Co. KG, Rehburg-Loccum (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,627
(22) PCT Filed: Dec. 15, 1998
(86) PCT No.: PCT/DE98/03690
§ 371 (c)(1), (2), (4) Date: Aug. 19, 1999
(87) PCT Pub. No.: WO99/32314
PCT Pub. Date: Jul. 1, 1999

(30) Foreign Application Priority Data

Dec. 22, 1997 (DE) .......................... 197 57 225

(51) Int. Cl.[7] .............................. E06B 7/16; B60J 10/00
(52) U.S. Cl. ...................... 49/495.1; 49/490.1; 49/475.1
(58) Field of Search .............................. 49/475.1, 484.1, 49/490.1, 495.1

(56) References Cited

U.S. PATENT DOCUMENTS

| | | | | |
|---|---|---|---|---|
| 4,538,380 A | * | 9/1985 | Colliander | 49/475.1 |
| 4,678,227 A | * | 7/1987 | Castagno | 296/213 |
| 5,032,444 A | * | 7/1991 | Desir | 428/122 |
| 5,123,693 A | * | 6/1992 | Karashima et al. | 296/135 |
| 5,147,105 A | * | 9/1992 | Ono et al. | 296/146.9 |
| 5,207,029 A | * | 5/1993 | Nozaki et al. | 49/495.1 |
| 5,319,883 A | * | 6/1994 | Gueneau et al. | 49/489.1 |
| 5,411,785 A | * | 5/1995 | Cook | 428/122 |
| 5,437,124 A | * | 8/1995 | Ahlfeld et al. | 49/479.1 |
| 5,553,913 A | * | 9/1996 | Nabuurs | 296/216.09 |

FOREIGN PATENT DOCUMENTS

| | | | | |
|---|---|---|---|---|
| DE | 44 01 432 | 6/1995 | | |
| DE | 195 16 839 | 11/1996 | | |
| EP | 468174 | * 1/1992 | | 49/490.1 |
| EP | 0 479 643 | 4/1992 | | |
| EP | 0 587 428 | 3/1994 | | |
| EP | 0 637 604 | 2/1995 | | |
| EP | 0 799 748 | 10/1997 | | |
| EP | 0 863 036 | 9/1998 | | |
| GB | 2137268 | * 10/1984 | | 49/475.1 |

* cited by examiner

Primary Examiner—Gregory J. Strimbu
(74) Attorney, Agent, or Firm—Collard & Roe, P.C.

(57) ABSTRACT

A sealing profile for use in automobile door openings, having a profile body and a covering element secured to the profile body. The covering element is made of two layers, a lower layer facing the profile body and comprising an unfoamed thermoplastic elastomer, and an upper layer facing away from the profile body and comprising a water foamed thermoplastic elastomer. The sealing profile can be used to seal the door of the automobile against the interior roof of the automobile in an attractive an economical manner.

11 Claims, 1 Drawing Sheet

SEALING PROFILE HAVING A TWO LAYER COVERING ELEMENT

BACKGROUND OF THE INVENTION

1. Field of the Invention

The invention relates to a profile, particularly a sealing profile preferably employed within the region of openings such as doors and windows preferably in motor vehicles; with a basic body of the profile and with a covering element secured on the basic body of the profile.

A profile of such type is used, for example in the interior of a motor vehicle within the region of an inside door lining and/or within the zone of the roof as an inside seal. Such a profile serves for sealing and its covering element is to form a smooth transition, for example of the roof to adjacent structural components, and at the same time as an element compensating tolerances with respect to the roof.

2. The Prior Art

A known profile of the type specified above has a basic body of the profile, on which a covering element is secured designed in the form of a structural PVC component coated with a fabric. The basic body of the known profile is at least in sections covered by said structural PVC component coated with fabric. PVC, however, is a plastic material with a relatively unattractive appearance. A plastic component made of PVC and used in a motor vehicle, and particularly in a passenger car, cannot give the impression of high quality. PVC rather looks like cheap plastic, for which reason it is not employed especially in passenger cars of a higher quality. For such motor vehicles, the prior art makes provision for coating the PVC with a fabric. Such a fabric coating does in fact provide the covering element with the appearance of higher quality; however, such a coating with fabric substantially raises the manufacturing cost of the covering element and consequently increases the overall cost of the profile.

SUMMARY OF THE INVENTION

The invention is based on the problem of providing a profile of the type specified above that can be manufactured at more favorable cost as compared to the production of known profiles, and which in particular has properties that make such a profile suitable for use in motor vehicles.

Said problem is solved according to the invention in that the covering element of the profile is produced from TPE (thermoplastic elastomer).

TPE is a plastic with a surface with the appearance of high quality. Because of such high-quality appearance, TPE can be employed as a material for the covering element also in motor vehicles of higher quality. Coating with a fabric or the like can be advantageously omitted when TPE is used, so that the manufacturing costs for producing the covering element and consequently the overall production costs of the profile can be advantageously minimized. Manufacturing the covering element from TPE offers the further benefit that TPE is a plastic material that can be recycled in simple ways. Particularly excess TPE material collected in the manufacture of the covering element, for example, can be recycled into the processing process.

According to a further development of the invention, provision is made that the covering element is produced from foamed TPE. By using foamed TPE it is possible to produce in an advantageous way an attractive surface structure of the covering element of the profile. Foamed TPE has a surface structure closely resembling the one of tanned leather. For said reason, the profile as defined by the invention can be used as a sealing section also in high-quality passenger motor vehicles without providing for a fabric coating. Preferably, the TPE is foamed with water, whereby the surface structure of the covering element can be adapted to the desired design of such structure in a simple way and at favorable cost by changing the addition of water in the course of the manufacturing process. Furthermore, foating the TPE with water is a measure protecting the environment.

The basic body of the profile as defined by the invention is particularly made from rubber. Rubber is an elastic material, so that it is well-suitable for use as of sealing section in the known way.

According to a preferred further development of the invention, provision is made that the covering element comprises at least two layers, whereby one layer facing the basic body of the profile is made of unfoamed TPE and the one facing away from the basic body of the profile is made from TPE preferably foamed with water. The covering element of said profile as defined by the invention is manufactured from TPE as well, whereby said covering element, however, is preferably formed by two layers, and the two TPE-layers are produced from TPE in different states of said material. For example, the lower layer facing the basic body of the profile is produced from unfoamed TPE. Said lower unfoamed layer of TPE is advantageously permanently joined with the basic body of rubber of the profile because a connection between rubber and unfoamed TPE can be produced with very high strength of the joint. Such a connection is particularly more solid than a connection between rubber and foamed TPE. The other, for example the upper layer of the covering element facing away from the basic body of the profile, however, is produced from foamed TPE, which offers the advantages specified above with respect to its surface structure. Therefore, using a multilayered covering element made of TPE assures, on the one hand, a solid joint between the covering element and the basic body of the profile, and achieves covering of the basic body of the profile with a covering element having the preferred surface properties, on the other hand. Moreover, such multilayered design of the covering element enhances its freedom of folds and bends particularly when it is subjected to bending stress. The radii behavior is improved. The covering element comprising at least two layers is preferably manufactured in one common extrusion process.

For securing the covering element on the basic body of the profile, provision may be made that the covering element is solidly glued to the basic body of the profile. In this way, a permanent joint of said two components of the profile is obtainable. However, in a preferred embodiment, provision is made that the covering element is welded to the basic body of the profile. With such preferred way of fastening the covering element, a permanent connection of the two structural components of the profile is achieved, in which said components mutually abut each other directly, so that no application of an additional adhesive is required.

The covering element is preferably designed in the form of a covering lip particularly if the profile is used in the interior of a passenger motor vehicle. A covering lip can cover a wide region of the basic body of the profile, so that said basic rubber body of the profile is not visible from the interior of the passenger motor vehicle. Moreover, the covering lip can effect the desired smooth transition between the basic body of the profile and the roof of the passenger car in that a terminating end of the covering lip comes to rest on the roof particularly at an acute angle.

Finally, in a preferred embodiment, provision is made that the covering lip has a coloring. By dyeing the covering lip, the latter and thus the part of the profile which is visible from the interior of the passenger motor vehicle can be adapted to the interior appointments of the passenger car. In particular, the covering lip may have a color matching, for example the color of the seats or of the interior lining of the doors or of the roof of the passenger motor vehicle.

BRIEF DESCRIPTION OF THE DRAWINGS

An exemplified embodiment of the invention showing additional inventive features of the invention is represented in the drawing, which shows a cross section of a profile as defined by the invention, in particular a sealing section as defined by the invention.

DETAILED DESCRIPTION OF THE PREFERRED EMBODIMENT

Figure 1:
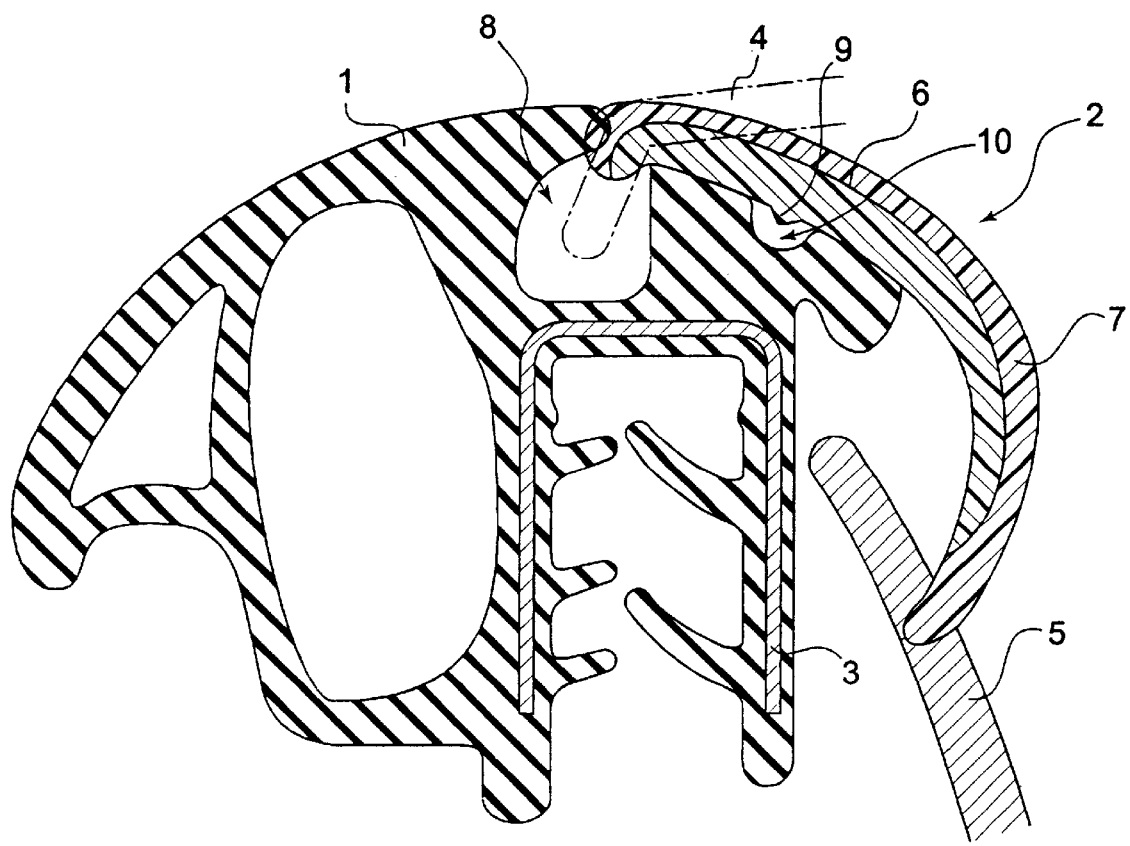

The profile shown in the drawing, in particular the sealing section has a basic profile body 1 and a covering element 2 secured on said basic body 1 of the profile. Basic profile body 1 is designed in the form of a plug foot and produced from rubber. For the purpose of stabilizing basic profile body 1, a steel insert 3 designed in the form of a U-section is inserted in said basic body 1.

The profile shown in the drawing serves as a sealing section between an interior door lining 4 shown broken and indicated by dash-dotted lines, and a roof 5 of a passenger motor vehicle represented in the same way. In the upper zone shown in the drawing, basic profile body 1 has a plug pocket 8 for receiving the free end of interior door lining 4. In plug pocket 8, interior door lining 4 is plugged into basic profile body 1. In the right-hand zone of basic profile body 1 shown in the drawing, the free end of roof 5 is installed against a section of basic profile body 1 from the outside. The space section between interior door lining 4 and roof 5 is covered in this connection by covering element 2 of the section, whereby covering element 2 covers basic profile body 1 at the same time. For this purpose, covering element 2 is designed in the form of a covering lip which, viewed by its section, has a shape approximately curved parabolically. The free end of covering element 2 facing the roof 5 covers the free end of roof 5.

Covering element 2 of the profile as defined by the invention is produced from TPE (thermoplastic elastomer). Covering element 2 made of TPE comprises two layers over wide regions of its parabolic curvature, whereby the layer 6 facing the basic profile body 1 is produced from unfoamed TPE and the layer 7 facing away from basic profile body 1 is manufactured from TPE foamed with water. Layer 6 consisting of unfoamed TPE is solidly joined with basic profile body 1 made of rubber. Such permanent joint is produced by directly welding basic body 1 and layer 6 of covering element 2 together. From layer 6, a projection 9 protrudes into an associated deepening 10 in basic profile body 1. Projection 9 and deepening 10 serve as positioning aids and controls for correctly positioning and associating covering element 2 and basic profile body 1 before said components are fixed on each other by welding.

Layer 7, which is facing away from basic body 1 of the profile, but facing the interior of a motor vehicle, has a structured surface because it is produced from foamed TPE, such structured surface imparting the impression of high quality. Layer 7 made of foamed TPE may directly point into the interior of the passenger motor vehicle and, in particular, needs not to be adapted to any fabric coating or door lining or roof. However, layer 7 made of foamed TPE has to have a color matching said structural components of a vehicle. The first and second layers extend only over a part of the covering element. The thickness of the first layer decreases from a proximal end of the covering element toward a distal end of the covering element. The distal end of the covering element is made only from the second layer. The first and second layer are almost parallel to a generally vertical side of the plug pocket at an end of the covering element adjacent the plug pocket.

What is claimed is:

1. In combination, a sealing profile and a door opening of a motor vehicle, comprising:
    a profile body made of elastic material;
    a covering element made of thermoplastic elastomer secured to the profile body, said covering element comprising:
        a first layer in contact with and secured to the profile body, said first layer comprising thermoplastic elastomer; and
        a second layer mounted on said first layer and facing away from the profile body towards an interior area of the motor vehicle, said second layer comprising a water foamed thermoplastic elastomer.
2. The combination according to claim 1, wherein the profile body is made of rubber.
3. The combination according to claim 1, wherein the covering element is glued to the profile body.
4. The combination according to claim 1, wherein the covering element is welded to the profile body.
5. The combination according to claim 1, wherein the covering element has a parabolically curved lip shape.
6. The combination according to claim 5, wherein the covering element is colored.
7. The combination according to claim 1, wherein the first and second layers extend only over a part of the covering element.
8. The combination according to claim 1, wherein a thickness of the first layer decreases from a proximal end of the covering element toward a distal end of the covering element.
9. The combination according to claim 8, wherein the distal end of the covering element is made only from said second layer.
10. The combination according to claim 1, wherein the profile body further comprises a plug pocket for receiving a free end of the door opening.
11. The combination according to claim 10, wherein the first and second layers are almost parallel to a generally vertical side of the plug pocket at an end of the covering element adjacent the plug pocket the first and second layers are almost parallel to the plug pocket.

* * * * *